(12) United States Patent
Steiner et al.

(10) Patent No.: US 8,349,037 B2
(45) Date of Patent: Jan. 8, 2013

(54) ADSORBER MATERIAL AND PROCESS FOR DESULFURIZING HYDROCARBONACEOUS GASES

(75) Inventors: Jochen Steiner, Bensheim (DE); Alexander Schäfer, Mannheim (DE); Annebart Engbert Wentink, Mannheim (DE); Ekkehard Schwab, Neustadt (DE); Helmut Boos, Edesheim (DE); Patrick Amrhein, Princeton, NJ (US)

(73) Assignee: BASF SE, Ludwigshafen (DE)

( * ) Notice: Subject to any disclaimer, the term of this patent is extended or adjusted under 35 U.S.C. 154(b) by 69 days.

(21) Appl. No.: 13/061,625

(22) PCT Filed: Aug. 27, 2009

(86) PCT No.: PCT/EP2009/061086
§ 371 (c)(1),
(2), (4) Date: May 5, 2011

(87) PCT Pub. No.: WO2010/023249
PCT Pub. Date: Mar. 4, 2010

(65) Prior Publication Data
US 2011/0200507 A1    Aug. 18, 2011

(30) Foreign Application Priority Data

Sep. 1, 2008 (EP) .................. 08163363
Dec. 29, 2008 (EP) .................. 08173009

(51) Int. Cl.
*C10L 3/00* (2006.01)
*C10L 3/10* (2006.01)

(52) U.S. Cl. .............. 48/127.3; 48/127.5; 48/127.7
(58) Field of Classification Search ............. 48/127.3, 48/127.5, 127.7
See application file for complete search history.

(56) References Cited

U.S. PATENT DOCUMENTS

| | | | |
|---|---|---|---|
| 3,942,957 A * | 3/1976 | Stroud ................. | 48/127.7 |
| 4,251,495 A | 2/1981 | Deschamps et al. | |
| 4,419,273 A | 12/1983 | Santilli et al. | |
| 4,892,718 A | 1/1990 | Peter et al. | |
| 5,763,350 A | 6/1998 | Immel et al. | |
| 6,024,933 A | 2/2000 | Legendre et al. | |
| 2002/0159939 A1 | 10/2002 | Lieftink et al. | |
| 2007/0093385 A1 | 4/2007 | Kim et al. | |
| 2010/0233054 A1 | 9/2010 | Steiner | |

FOREIGN PATENT DOCUMENTS

| | | |
|---|---|---|
| DE | 3525871 A1 | 1/1987 |
| DE | 4213642 A1 | 10/1993 |
| EP | 1121977 A2 | 8/2001 |
| EP | 1245268 A2 | 10/2002 |
| EP | 1468857 A2 | 10/2004 |
| GB | 203354 A | 9/1923 |
| WO | WO-2004/056949 A1 | 7/2004 |
| WO | WO-2004/069367 A2 | 8/2004 |
| WO | WO-2007/021084 A1 | 2/2007 |

* cited by examiner

Primary Examiner — Timothy Vanoy
(74) Attorney, Agent, or Firm — Connolly Bove Lodge & Hutz LLP

(57) ABSTRACT

A process for removing sulfur compounds from a hydrocarbonaceous gas mixture, which comprises contacting the hydrocarbonaceous gas mixture with an adsorber material comprising copper oxide on magnesium silicate as support material.

17 Claims, 2 Drawing Sheets

ADSORBER MATERIAL AND PROCESS FOR DESULFURIZING HYDROCARBONACEOUS GASES

CROSS-REFERENCE TO RELATED APPLICATIONS

This application is a national stage application (under 35 U.S.C. §371) of PCT/EP2009/061086, filed Aug. 27, 2009, which claims benefit of European patent application nos. 08163363.8, filed Sep. 1, 2008 and 08173009.5, filed Dec. 29, 2008. The contents of each of the referenced applications are incorporated herein by reference in their entireties.

FIELD OF THE INVENTION

The invention relates to an adsorber material and also processes for desulfurizing hydrocarbonaceous gases, in particular for use in fuel cell systems.

BACKGROUND

Hydrocarbonaceous gases such as, for example, natural gas or liquid gas, in addition to the usually naturally occurring sulfur compounds, also comprise sulfur compounds which are added to these gases for safety reasons.

On an industrial scale, natural gas is predominantly desulfurized by catalytic hydrogenation with addition of hydrogen. However, this desulfurization method cannot be used appropriately for small and very small applications, especially fuel cells in the domestic sector, and so in this case use is chiefly made of an adsorptive method for purifying the gas stream.

The hydrogen necessary for operation in fuel cells is usually obtained by reforming natural gas. Natural gas possesses, especially in highly industrialized countries, the advantage of wide-scale availability, since a fine-meshed supply grid exists. In addition, natural gas has a hydrogen/carbon ratio which is expediently high for hydrogen generation.

The expression "natural gas" describes a multiplicity of possible gas compositions which can vary greatly depending on the locality. Natural gas can comprise virtually exclusively methane ($CH_4$), but can also comprise considerable amounts of higher hydrocarbons. The expression "higher hydrocarbons" is taken to mean here all hydrocarbons from ethane ($C_2H_6$), regardless of whether these are linearly saturated or unsaturated, cyclic or aromatic hydrocarbons. Typically, the fractions of higher hydrocarbons in the natural gas decrease with higher molecular weight and higher vapor pressure. For instance, ethane and propane are usually found in the low percentage range, whereas hydrocarbons having more than ten carbon atoms are usually present in natural gas only at a few ppm. Among the higher hydrocarbons are also cyclic compounds such as, for example, the carcinogenic benzene, toluene and xylenes. Each of these compounds can occur in concentrations of >100 ppm.

In addition to the higher hydrocarbons, other minor gas components and impurities which may comprise heteroatoms occur in natural gas.

In this context, in particular, mention may be made of sulfur compounds of natural origin which can occur at low concentrations. Examples thereof are hydrogen sulfide ($H_2S$), carbonyl sulfide (COS), carbon disulfide ($CS_2$) and light organosulfur compounds such as, for example, MeSH. Depending on the origin of the gas, the COS which is difficult to remove, especially, can occur at an elevated concentration which makes a complex purification stage necessary.

In addition to the sulfur compounds naturally present in natural gas such as, especially, $H_2S$ and COS, other sulfur compounds are added to the natural gas for safety reasons as what are termed odorants. Methane and natural gas are odorless gases per se which are nontoxic but, in combination with air, can lead to explosive mixtures. In order to be able to detect an escape of natural gas immediately, natural gas is admixed with intensely odorous substances at a low concentration which, as what are termed odorants, give the characteristic odor of natural gas. The odorization of natural gas is prescribed by law in most countries—together with the odorants which are to be used. In some countries such as, for example, the United States of America, mercaptans (R—S—H, R=alkyl moiety) such as tert-butylmercaptan or ethylmercaptan, are used as odorants, whereas in the member states of the European Union, usually cyclic sulfur compounds such as tetrahydrothiophene (THT) are used. Owing to a possibly proceeding chemical reaction, from these mercaptans (R—S—H), sulfides (R—S—R) and/or disulfides (R—S—S—R) can be formed which must likewise be removed. Together with the naturally occurring sulfur compounds, therefore this gives a multiplicity of different sulfur compounds in the natural gas. The differing regulations for the composition of natural gas usually permit up to 100 ppm of sulfur in the natural gas. The situation with liquid gas (LPG) as feedstock is similar. Liquid gas which comprises, as main constituents, propane and butane, must, just as natural gas, be admixed with sulfur-comprising molecules as odor markers.

The sulfur components in the natural gas or LPG can lead to strong and irreversible poisoning of the catalysts in the fuel cell or in the reformer. For this reason the gases which are fed to the fuel cell must be purified from all sulfur-comprising components. Fuel cells, for this reason, always comprise a desulfurization unit for the natural gas or LPG used. Should the fuel cell be operated with liquid hydrocarbons such as, for example, heating oil, desulfurization is likewise necessary.

Preference is given to a process procedure in which the hydrocarbonaceous gas is passed in straight throughflow at room temperature through an adsorber which completely removes virtually all sulfur components. The adsorber should preferably operate at the operating temperature and operating pressure of the fuel cell. For safety reasons, the adsorber container is generally located in the housing of the fuel cell. Temperatures of up to 70° C. can prevail there. In addition, the pressure in the gas pipe grid at the end user is generally up to several hundred mbar above ambient pressure.

Since the adsorber is intended to be suitable for the operation of natural gases of differing composition, it is in addition of importance that only the sulfur-comprising components are adsorbed from the natural gas and the co-adsorption of higher hydrocarbons is suppressed to a negligible extent.

The co-adsorption of higher hydrocarbons, in particular benzene, from natural gas, can in addition have the consequence that legal limiting values for benzene contents in the adsorber are exceeded and the adsorber unit must then be labeled. Such benzene-saturated adsorbers in addition, e.g. during change of the adsorber medium or during transport of the adsorber to recycling, give rise to considerable increased complexity and costs.

In the current prior art, desulfurization of natural gas succeeds only via a two-stage arrangement of different adsorbents which are used especially for removing the natural sulfur components and the odorants.

US-A 2002/0159939 discloses a two-stage catalyst bed comprising an X-zeolite for removing odorants and, subsequently thereto, a nickel-based catalyst for removing sulfur-comprising components from natural gas for operation in fuel cells. A disadvantage of this process is that COS cannot be eliminated directly, but only after preceding hydrolysis to $H_2S$. In addition, benzene and higher hydrocarbons are taken up by the zeolite. In addition, nickel is known as carcinogenic.

U.S. Pat. No. 5,763,350, for removing naturally occurring sulfur compounds, proposes inorganic supports, preferably aluminum oxide, impregnated with a mixture of oxides of elements of groups IB, IIB, VIB and VIIIB of the Periodic Table of the Elements, preferably a mixture of Cu, Fe, Mo and Zn oxides. Here also, the sulfur compounds are first hydrolyzed to $H_2S$.

According to DE-A 3 525 871, naturally occurring organosulfur compounds, such as COS and CS2, which are present in gas mixtures are quantitatively eliminated using sulfur oxides or nitrogen oxides in the presence of catalysts, wherein the catalysts used are compounds of Sc, Y, of the lanthanides, actinides or mixtures thereof on, e.g., aluminum oxide. The catalysts, during their production, are dried and sintered at 100 to 1000° C.

According to U.S. Pat. No. 6,024,933, the sulfur components are directly oxidized to elemental sulfur or to sulfates on a supported copper catalyst which, on aluminum oxide as support, has at least one other catalytically active element selected from the group Fe, Mo, Ti, Ni, Co, Sn, Ge, Ga, Ru, Sb, Nb, Mn, V, Mg, Ca and Cr.

WO 2007/021084 describes a copper-zinc-aluminum composite as desulfurizing agent, which composite is calcined at 200 to 500° C.

EP-A 1 121 977 discloses removal by adsorption of sulfur-comprising odorants such as sulfides, mercaptans and thiophenes from natural gas using silver-doped zeolites at room temperature.

A further important disadvantage—in addition to the high silver content—of the zeolite-based systems is the fact that zeolites readily adsorb in their pore system all higher hydrocarbons occurring in the gas stream. In particular cyclic hydrocarbons such as, e.g., benzene, are completely adsorbed and can be accumulated in the zeolite up to the range of some % by weight.

The processes of the prior art do not solve the problem of unwanted co-adsorption in the pore system of the catalyst of, in particular, cyclic hydrocarbons occurring in the gas stream such as, e.g., benzene. A further disadvantage is that the adsorption of higher hydrocarbons, in some circumstances, leads to pyrophoric adsorbents, so that, in the presence of an ignition source, they can catch fire during removal of the spent catalyst. A further disadvantage is that COS can generally only be removed with the aid of an upstream hydrolysis stage.

BRIEF SUMMARY

The object of the present invention therefore is to provide an adsorption means which has a high uptake capacity not only for natural sulfur compounds such as COS and $H_2S$, but also for organic sulfides (mercaptans such as ethylmercaptan), disulfides and cyclic odorants, in particular tetrahydrothiophene (THT) and at the same time has a very low co-adsorption of benzene.

The object is achieved by a process for removing sulfur compounds from a hydrocarbonaceous gas mixture, which comprises contacting the hydrocarbonaceous gas mixture with an adsorber material comprising copper oxide on magnesium silicate as support material.

DETAILED DESCRIPTION OF THE PREFERRED EMBODIMENTS

Figure 1A:
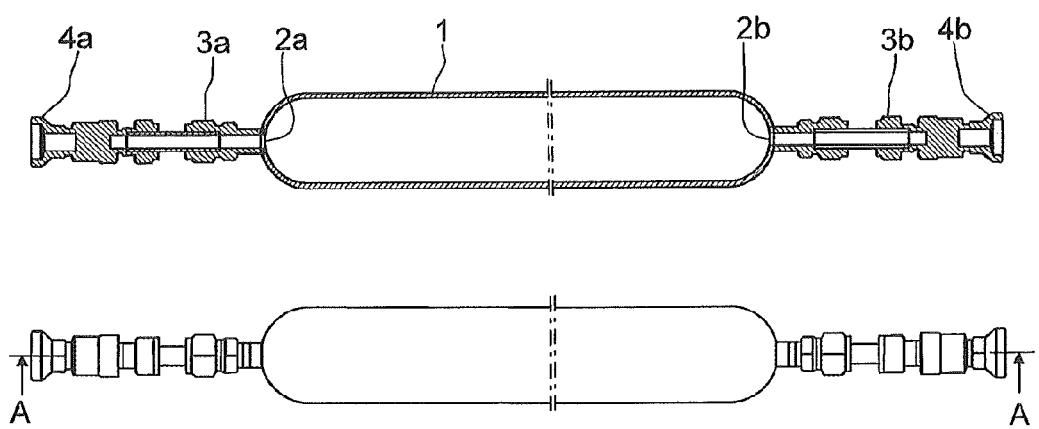
FIG. 1A depicts one embodiment of an exchangeable cartridge comprising a container, filter cloths, screw-in threaded joints and gas-tight quick-action couplings.

The adsorber material used according to the invention comprises generally 30 to 70% by weight, preferably 40 to 60% by weight, particularly preferably 46 to 54% by weight, and in particular 48 to 52% by weight of copper oxide. This is present essentially, preferably completely, as copper(II) oxide CuO. In addition, the adsorber material used according to the invention can comprise, as minor constituents, up to 5% by weight of one or more other oxides of metals and transition metals of groups 2 and 4 to 12 of the Periodic Table of the Elements. Generally, the content of minor constituents is a maximum of 2% by weight. Examples of minor constituents are oxides of chromium ($Cr_2O_3$), barium and zinc. Generally, the total metal oxide content is therefore 30 to 75% by weight, preferably 40 to 62% by weight, of the sum of magnesium silicate support and metal oxides.

Generally, the $SiO_2$ content of the magnesium silicate is from 32 to 38% by weight, and the MgO content is from 12 to 18% by weight; stoichiometric magnesium silicate has the empirical formula $Mg_2SiO_4$.

The adsorber material used according to the invention can be produced as described hereinafter.

In this process an alkaline aqueous sodium silicate solution is combined with the aqueous solution of a magnesium salt, in particular magnesium nitrate. To the resultant magnesium silicate solution are added simultaneously the solution of a copper salt, preferably copper nitrate, which can comprise other metal salts, and soda solution. If appropriate, the metal salt solutions of the other metals can also be added separately (but simultaneously with copper salt and soda solutions). The deposit is filtered off, dried and if appropriate calcined.

In particular the adsorber material can be produced as follows: a strongly alkaline sodium water glass solution (pH approximately 13) is combined with a magnesium nitrate solution in a precipitation vessel, homogenized and heated to a max. of 40° C. The amounts of substance used (in kg) of $SiO_2$, $Na_2O$ and MgO are in the relationship 2.0:1.25:1.0. The magnesium silicate solution produced in this preprecipitation is subsequently heated to a max. of 70° C.

A metal salt solution is made up separately. The amount and composition of the metal salt solution depends on the desired final composition of the oxidic metal supported on the magnesium silicate. Generally, the metal oxide fraction is between 30 and 70% by weight (based on the total mass) and may be composed of metals of group 2, and/or one or more transition metals of group 4 to 12. The metals are charged in the form of readily soluble salts in acidified aqueous solution.

The metal salt solution is likewise heated to a max. of 70° C. and added to the magnesium silicate solution. By adding a soda solution, the pH of the precipitation is kept constant at approximately 7. Depending on the requirements of crystallite size of the precipitated material, aging of the precipitation can be carried out, i.e. the residence time at elevated temperature in the precipitation vessel is prolonged.

After completion of precipitation or precipitation and aging, the suspension is transferred to a filter press, filtered and washed with deionized water to a conductivity value<100 µS/cm. The filter mass is subsequently dried and calcined to the desired loss on ignition in a rotary furnace. The resultant powder can be further processed in subsequent steps to form tablets, extrudates or other familiar shaped bodies.

A recalcination can be carried out if necessary to set the pore radii distribution and the surface area, which recalcination is preferably carried out between 1 and 3 h at 400 to 700° C. Without recalcination, the adsorber material has a higher fraction of pores having a radius of less than 6 nm. Generally, the pore volume in this range is >10% of the total pore volume, determined using mercury porosimetry. By recalcination, the fraction of pores having pore radii of less than 6 nm is markedly reduced. Therefore, the fraction of the pore volume after recalcination has been carried out in the stated temperature range is generally <5% of the total pore volume. As a result, the tendency of the materials to co-adsorb hydrocarbons is markedly reduced.

The adsorber material used according to the invention adsorbs sulfur-comprising components from hydrocarbonaceous gas, in particular natural gas, wherein the co-adsorption of higher hydrocarbons is reduced to a negligible extent. The adsorber material is characterized by high adsorption capacities for sulfur compounds and thereby sufficiently long service times, as a result of which the frequent replacement of the adsorber material can be avoided. The adsorber material is suitable for desulfurizing hydrocarbonaceous gas mixtures of differing composition.

The hydrocarbonaceous gas mixture to be purified is, in particular, natural gas. This comprises very predominantly methane, but can comprise up to 10% by volume of higher hydrocarbons. Preference is further given to LPG (liquid petroleum gas). This generally comprises at least 90% by volume of propane and butane.

Generally, the hydrocarbonaceous gas mixture to be purified comprises in total 1 to 500 ppm, preferably 5 to 250 ppm, of one or more sulfur-comprising components. Frequently, sulfur-comprising components are present in the following amounts:

| | |
|---|---|
| $H_2S$ | 0.5 to 50 ppm; |
| COS | 0.5 to 100 ppm; |
| Mercaptans | 0 to 100 ppm, preferably 1 to 100 ppm; |
| Sulfides | 0 to 100 ppm, preferably 1 to 100 ppm; |
| Tetrahydrothiophene | 0 to 20 ppm, preferably 0.5 to 20 ppm. |

A customary mercaptan which may be met in the hydrocarbonaceous gases which are to be purified is ethylmercaptan, a customary sulfide is dimethyl sulfide.

The hydrocarbonaceous gas which is contaminated by sulfur compounds can be passed over the adsorber material used according to the invention at a temperature of (−50) to 150° C., preferably (−20) to 80° C., particularly preferably 0 to 80° C., in particular 15 to 60° C., and at a pressure of 0.1 to 10 bar, preferably 0.5 to 4.5 bar, particularly preferably 0.8 to 2.0 bar.

Advantageously, the hydrocarbonaceous gas is passed in straight throughflow through this adsorber material. The process is operated particularly preferably at room temperature and at atmospheric pressure.

The uptake capacity of the adsorber material for a sulfur component is calculated from the median concentration in the test gas of this sulfur component and the time after which the first sulfur compound is detected in the online GC. A generally valid formula is as follows: capacity [g/l]=(concentration [mg/m$^3$]×gas volume [m$^3$/h]×run time [h])/(volume of catalyst [m$^3$]×1 000 000). Run time is taken to mean the time up to which no sulfur compound is detected on the GC. The gas volume corresponds to the test gas stream under standard conditions.

Since, in particular, the THT capacity of the adsorber material owing to the physisorptive interaction depends on the concentration, for testing only THT concentrations are used which correspond to a realistic odorization of the gas grids. The test gas used is therefore a gas stream having a mean 3 ppm by volume of THT and 60 ppm by volume of benzene.

Using the desulfurization process according to the invention the sulfur components are completely removed. Completely in the context of this invention means a removal to below the currently possible detection limit with measurement by means of GC, which is 0.04 ppm. Therefore the process and also the catalyst according to the invention are outstandingly suitable, in particular, for use in fuel cell applications.

From the gas stream there are adsorbed not only $H_2S$, COS and $CS_2$, but also mercaptans, sulfides, disulfides and cyclic sulfur compounds such as THT.

In connection with a fuel cell system, the process according to the invention can be connected upstream of the reforming stage. In this case the hydrocarbonaceous gas used for obtaining hydrogen downstream of the purification according to the invention may be fed directly into the reformer or directly into the fuel cell. In this case the process according to the invention is suitable for all known types of fuel cells such as low-temperature and high-temperature PEM fuel cells, phosphoric acid fuel cells (PAFC), MCFC fuel cells (melt carbonate) and high-temperature fuel cells (SOFC).

When the process according to the invention is used in conjunction with a fuel cell it can be advantageous, not to regenerate the spent catalyst directly in the system, but to replace it and after it is removed to regenerate it separately. This applies, in particular, to fuel cells of low power.

The process according to the invention is suitable, in particular, for use in stationary and mobile applications. Preferred uses in the stationary sector are, for example, fuel cell systems for simultaneous generation of power and heat such as combined heat and power units (CHP units), preferably in domestic energy supply. In addition, the system is suitable for purifying gas streams for desulfurizing natural gas for gas engines. For application in the mobile sector the process can be used for purifying hydrocarbons for fuel cells in cars, trucks, buses or locomotives, preferably cars and trucks, particularly preferably cars. It is irrelevant here whether fuel cells are only used for on-board power generation or for drive.

In one embodiment of the invention, the adsorber material is present in a replaceable desulfurization cartridge. The replaceable desulfurization cartridge may be easily and flexibly integrated into the abovementioned stationary and mobile applications. Suitable cartridges are, for example, cylindrical containers having screw-in threaded joints into which gas-tight quick-action couplings may be screwed. The gas-tight quick-action couplings can also be mounted directly on the container. A suitable cartridge design is given in FIGS. 1a and 1b.

FIG. 1a shows a possible embodiment of an exchangeable cartridge comprising a container 1, filter cloths 2a, 2b, screw-in threaded joints 3a, 3b and gas-tight quick-action couplings 4a, 4b.

Figure 1B:
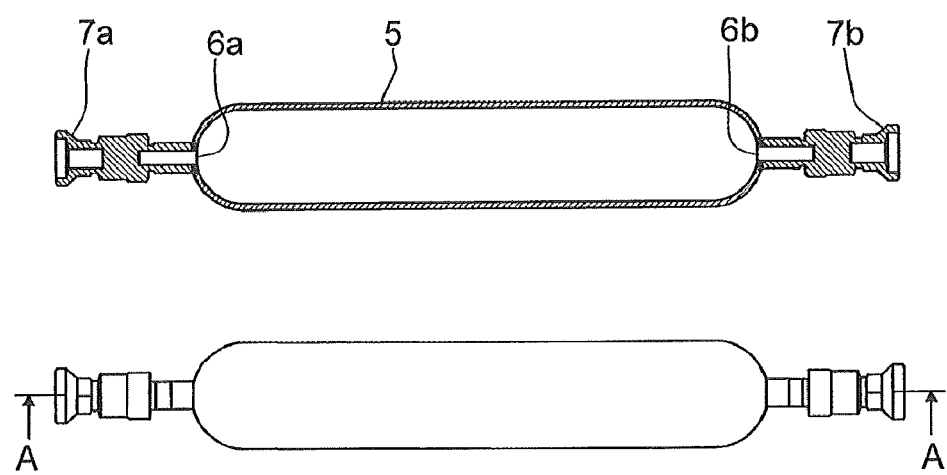
FIG. 1B depicts another embodiment of an exchangeable cartridge comprising a container, filter cloths and gas-tight quick-action couplings.

FIG. 1b shows another embodiment of an exchangeable cartridge comprising a container 5, filter cloths 6a, 6b and gas-tight quick-action couplings 7a, 7b.

By the use of quick-action couplings, the desulfurization cartridge can be replaced without problem at the end of the service life, for example on exhaustion of the chemisorptive and/or physisorptive capacity of the adsorber material used, without structural alterations needing to be performed at the use in question. The cartridge may therefore be simply replaced by a new cartridge having fresh or regenerated adsorber material. Also, charging the cartridge with adsorber material is possible without problems and quickly.

Preferably, the ratio of length to diameter of the cartridge for a given cartridge volume V, which in turn is given from the density of the adsorber material, the specific capacity of the adsorber material and also the desired total capacity (=total amount of sulfur-comprising components which are to be bound) is selected in such a manner that the pressure drop ΔP established over the entire length L of the cartridge is less than the line pressure at which the hydrocarbonaceous gas mixture to be purified is charged. The maximum possible length L of the cartridge is therefore a function of the specific pressure drop of the adsorber material and the desired total adsorption capacity for a given adsorber material. This length L and the required total volume V gives the diameter D of the cartridge.

The preferred cartridge layout of the exchangeable desulfurization cartridge may also be described by the formula below:

$$i = \Delta P^* \cdot \frac{V}{L \cdot D \cdot c}$$

where
ΔP*=specific pressure drop [in kPa/m]
V=cartridge volume [l]
L=cartridge length [m]
D=equivalent diameter of the cartridge [m]
c=mean proportional capacity.

The equivalent diameter D in this case is the diameter of the circular cross sectional area which corresponds to the cartridge cross sectional area. The mean proportional capacity c is given by:

$$c = x_1 \cdot c_1 + x_2 \cdot c_2 + \ldots + x_n \cdot c_n$$

where $x_n = V_n/V$ and $c_n$ =capacity of the adsorber n.

The ratio of L/D is preferably between 1.0 and 25. The value of the parameter i is preferably between 0 and 100.

Such a desulfurization cartridge is distinguished in that the minimum pressure drop owing to its dimensions permits efficient utilization of the adsorber volume. This leads to the best possible use of the adsorber material used with the greatest possible service life.

Of course, the exchangeable desulfurization cartridges can be operated using any desired suitable adsorption material. For example, they can also be operated using the adsorber materials described in WO 2004/056949 which comprise 1 to 99.8% by weight, in particular 5 to 70% by weight, of copper, silver, zinc, molybdenum, iron, cobalt, nickel or mixtures thereof and 0.2 to 99% by weight, in particular 30 to 95% by weight, of oxides of elements of groups IIB, IIIB, IVB, VIII, VIIIA and IVA of the Periodic Table of the Elements, such as the oxides of magnesium, calcium, scandium, yttrium, lanthanum, titanium, zirconium, chromium, tungsten, boron, aluminum, gallium, silicon, germanium and tin. A further highly suitable adsorber material comprises silver and preferably, in addition, copper on a support material, preferably aluminum oxide, in particular pure gamma-aluminum oxide, as described in EP 07114114.7 which was not published earlier than the priority date of the present application.

In a further preferred embodiment of the process according to the invention, the adsorber material which is loaded with the sulfur compounds is regenerated by contacting it with a hot nitrogenous gas stream. Preferably, the gas stream comprises at least 75% by volume of nitrogen. In order to accelerate the regeneration, the adsorber material which is to be regenerated can additionally be heated. In a further embodiment of the invention, the adsorber material is heated and brought into contact with a gas stream.

The adsorber material which is loaded with the sulfur compounds can be regenerated in the cartridge. For this, the cartridge is charged with the hot regenerating gas stream and preferably additionally heated externally.

Regeneration of the adsorber material in the cartridge is advantageous, in particular, when the capacity of the adsorber material with respect to the sulfur compounds bound only by physisorption (for example THT, dimethyl sulfide) is spent, but the adsorber material is still capable of uptake of the sulfur compounds which are bound by chemisorption (for example $H_2S$, ethylmercaptan). Then it is economically advantageous to desorb from the adsorber material in the previously described manner the sulfur compounds which are bound only by physisorption, and to reuse the adsorber material thus regenerated until its uptake capacity with respect to the sulfur components bound by chemisorption is spent. Only then is replacement of the used adsorber material by fresh adsorber material required, since the adsorber material cannot be easily regenerated with respect to the sulfur components which are bound by chemisorption (generally irreversibly).

In a further variant of the process according to the invention, therefore, the adsorber material is regenerated with respect to the sulfur compounds which are bound by physisorption at least once, but preferably many times, in the desulfurization cartridge and reused until the uptake capacity of the materials for the components which are bound by chemisorption is virtually reached, reached or exceeded. Preferably, the regeneration is achieved by passing a nitrogen stream over the adsorber material and at temperatures of 150 to 250° C., wherein only the nitrogen stream, only the adsorber material (by heating the cartridge externally) or both nitrogen stream and adsorber material can be heated. The regeneration time can be, for example, 3 to 12 hours. Said regeneration process is also suitable when, in the desulfurization cartridge, a mixture of at least two different adsorber materials is present, wherein the first adsorber material (adsorber class 1) binds sulfur compounds predominantly by chemisorption and the second adsorber material (adsorber class 2) binds sulfur compounds predominantly by physisorption.

Materials which bind sulfur compounds (for example $H_2S$) predominantly by chemisorption are, for example, those which comprise oxides of the metals Cu, Zn, Fe, Ni, Mn, Pb, Mg, Ca and Na. A suitable material of the adsorber class 1 comprises, for example, 40% by weight of CuO, 40% by weight of ZnO and 20% by weight of $Al_2O_3$. In addition to $H_2S$, said materials can also bind COS, mercaptans, thioethers, disulfides and THT by chemisorption.

Materials which bind sulfur compounds predominantly by physisorption are, for example, those which comprise one or more of the metals Ag, Cu, Mo, Mn or Zn in oxidic or sulfidic form. These bind especially disulfides, thioethers and THT.

Preferably, the above described regeneration process in which the adsorber material is regenerated with respect to the sulfur compounds which are bound by physisorption a plurality of times in the cartridge is carried out using the adsorber material comprising copper oxide on magnesium silicate as support material. This adsorber material is characterized by the fact that it binds certain sulfur compounds by physisorption and other sulfur compounds by chemisorption, wherein the uptake capacity with respect to the sulfur compounds bound by chemisorption is greater than with respect to the sulfur compounds bound by physisorption.

It is also possible to fill a cartridge only with physisorptive materials and to keep regenerating it.

The invention will be described in more detail on the basis of the exemplary embodiments hereinafter.

EXAMPLES

Example 1

Production of the Adsorber Material

Sodium waterglass solution (27% strength, 1.7 kg of $SiO_2$) is mixed with NaOH solution (25% strength, 1.0 kg of $Na_2O$) and 5 kg of deionized water (solution 1). In a reservoir, 7 kg of deionized water are heated to approximately 45° C. Into this heated reservoir, solution 1 and an Mg nitrate solution (8% strength, 0.8 kg of MgO) are added simultaneously. After completion of addition, the mixture is further stirred for 30 min at 55° C. To this precipitation solution are added in the course of several hours at 55° C., in parallel, two solutions of Cu nitrate (20% strength, 2.4 kg of CuO) and soda solution (20% strength, 5 kg of $Na_2CO_3$).

The resultant solid is filtered, washed nitrate-free and dried for 48 h at 120° C. until a loss on ignition of approximately 20% at 900° C. is achieved.

The dry mass is brought to and held at 220° C. for 3 h, subsequently mixed with approximately 4% graphite and tabletted to give shaped bodies (1.5×1.5 mm and 3×5 mm).

Physical Properties:

| | |
|---|---|
| CuO content | 50 g/100 g |
| $SiO_2$ content | 35 g/100 g |
| MgO content | 14 g/100 g |
| Remainder | Carbon |
| Median lateral compressive strength | 34N |
| Surface area | 310-330 $m^2$/g |
| Liter weight | 800-840 g/l |
| Porosity in water | 0.45-0.50 ml/g |
| Loss on ignition (900° C.) | 10-14% by weight |

Example 2

The adsorber of example 1 is recalcined for 2 h at 575° C.

Comparative Example 1

A commercially available adsorber based on a CuO/ZnO/$Al_2O_3$ formulation, as used in customary desulfurization solutions for natural gas, is used. The total mass of metal oxide here is over 75% by weight, based on the total mass of the adsorber.

All adsorber materials were used as identical crush fractions of 3×3 mm tablets. The reactor used was a heatable stainless steel tube through which flow was passed from top to bottom. Per experiment, 40 or 50 ml of catalyst were used. A commercially available natural gas (from Linde) was used.

For analysis of the gas downstream of the reactor, use was made of a commercial gas chromatograph which was equipped with two column switching and two detectors. The first detector, a flame ionization detector (FID), served for detecting the individual hydrocarbons in the natural gas, in particular benzene. The second detector, a flame photometric detector (FPD), is sensitive to sulfur compounds and permitted the detection of such compounds down to a practical detection limit of 0.04 ppm.

The capacity of the adsorber for the individual components is determined from the total gas amount (up to breakthrough of the first sulfur compound) and the concentration of the respective component in the feed gas. A pretreatment of the catalyst (e.g. reduction) is not necessary.

In general, in all tests up to the stated exhaustion of the uptake capacity, elimination of the individual sulfur-comprising components below the detection limit was achieved.

Individual Component Testing:

Dimethyl Sulfide:

Using a test gas cylinder, dimethyl sulfide (DMS, in natural gas) was metered into a volumetric stream of natural gas and thereby a median concentration of 20 ppm by volume in in total 170 liters (S.T.P.) per hour were passed over the catalyst (68 ml, corresponding to a GHSV of 2500 $h^{-1}$).

On breakthrough of DMS, the adsorber according to the invention (example 1) had reached a capacity of 6.6 g of DMS/l of catalyst. The reference adsorber (reference 1) only adsorbs 0.4 g of DMS/l of catalyst under the same conditions.

Tetrahydrothiophene:

Tetrahydrothiophene (THT) was selected as model substance for "organic" sulfur compounds since it is generally known that cyclic sulfur compounds, in contrast to sulfur-terminated compounds, can be removed by adsorption only with great difficulty. In addition, THT is the most widespread odorant in Germany.

The gas was enriched in a saturator with a mean 3 ppm by volume of THT and 60 ppm by volume of benzene and passed at a volumetric flow rate of 250 liters (S.T.P.) per hour over the catalyst (40 ml, corresponding to a GHSV of 6250 $h^{-1}$). The measurements were made at standard pressure (1013 mbar) and room temperature.

On breakthrough of THT, the adsorber according to the invention (example 1) had reached a capacity of 8.8 g of THT/l of catalyst. The reference adsorber (reference 1) only adsorbs 4.0 g of THT/l of catalyst under the same conditions.

The material according to example 2 shows, in an identical measurement, a THT capacity of 9.7 g/l of catalyst and, after breakthrough of THT, has a benzene content less than 0.1% by weight.

Ethylmercaptan:

A further odorant is ethylmercaptan (EtSH) which is used as an odorant in natural gas, but especially in LPG. In general it is known that when copper-comprising catalysts are used, oxidative dimerization of mercaptans to form disulfides (here: diethyl disulfide, DEDS) can occur. Therefore the total capacity of the adsorber is determined from the sulfur component which breaks through first (here: EtSH or DEDS).

The gas was enriched in a saturator with a mean 15 ppm by volume of EtSH and passed at a volumetric flow rate of 200 liters (S.T.P.) per hour of natural gas over the catalyst (80 ml, corresponding to a GHSV of 2500 $h^{-1}$). The measurements were made at standard pressure (1013 mbar) and room temperature.

On breakthrough of DEDS, the adsorber used according to the invention (example 1) had reached a capacity of over 45 g of EtSH/l of catalyst without breakthrough of a sulfur-comprising component having been observed. The reference adsorber (reference 1) adsorbs only 24.0 g of EtSH/l of catalyst on breakthrough of DEDS under the same conditions.

COS and $H_2S$ in the Presence of 2% by Volume of $CO_2$ in Natural Gas:

The removal of COS and $H_2S$ is a challenge for the absorbents, in particular in the presence of $CO_2$ in the gas. In this experiment, 50 ppm by volume of COS and 150 ppm by volume of $H_2S$ were passed into a stream of 167 liters (S.T.P.) per hour of natural gas and 3.4 liters (S.T.P.) per hour of $CO_2$ over the catalyst (70 ml, corresponding to a GHSV of 2500 h$^{-1}$). The measurements were made at standard pressure (1013 mbar) and room temperature.

Not only in the case of the adsorber according to the invention (example 1) but also in the case of the reference adsorber (reference 1), the breakthrough of COS proceeded first. The capacity is therefore reported for the breakthrough time point of COS. At this time point the adsorber according to the invention (example 1) has reached a capacity of greater than 60 g of H$_2$S/l of catalyst and 16 g of COS/l of catalyst. The reference adsorber (reference 1), under the same conditions, adsorbs 58 g of H$_2$S/l of catalyst and only 3 g of COS/l of catalyst.

Compared with the reference material, the capacities are significantly exceeded for all customary sulfur components in the natural gas. Above all, COS which occurs as the most important natural gas minor component in Germany is very effectively removed from the adsorber used according to the invention.

Owing to the high capacity for THT and the low dimerization activity of the adsorber for mercaptans, the adsorber is suitable for a single-stage desulfurization of natural gas, LPG and other (gaseous) hydrocarbons. Important application advantages result therefrom compared with the 2-stage adsorption using structured beds of the prior art.

The invention claimed is:

1. A process for removing sulfur compounds from a hydrocarbonaceous gas mixture, which comprises contacting the hydrocarbonaceous gas mixture with an adsorber material comprising copper oxide on magnesium silicate as support material, wherein the sulfur compounds are selected from the group consisting of mercaptanes, organic sulfides, disulfides and cyclic sulfur compounds.

2. The process according to claim 1, wherein the adsorber material removes the sulfur compounds below the detection limit of including 0.04 ppm.

3. The process according to claim 1, wherein the adsorber material comprises 30 to 70% by weight of CuO.

4. The process according to claim 1, wherein the adsorber material comprises up to 2% by weight of one or more other metal oxides of metals of groups 2 and 4 to 12 of the Periodic Table, wherein the total metal oxide content is 40 to 62% by weight.

5. The process according to claim 1, wherein the hydrocarbonaceous gas mixture comprises 1 to 500 ppm of sulfur compounds.

6. The process according to claim 1, wherein the hydrocarbonaceous gas mixture comprises 0.5 to 50 ppm of H$_2$S.

7. The process according to claim 1, wherein the hydrocarbonaceous gas mixture comprises 1 to 100 ppm of COS.

8. The process according to claim 1, wherein the hydrocarbonaceous gas mixture comprises 0.5 to 20 ppm of tetrahydrothiophene.

9. The process according to claim 1, wherein the hydrocarbonaceous gas mixture comprises 1 to 100 ppm of dimethyl sulfide.

10. The process according to claim 1, wherein the hydrocarbonaceous gas mixture comprises 1 to 100 ppm of ethylmercaptan.

11. The process according to claim 1, wherein the hydrocarbonaceous gas mixture is natural gas.

12. The process according to claim 1, wherein the adsorber material binds the sulfur compounds in part by chemisorption and in part by physisorption, which comprises the adsorber material being present in an exchangeable container (cartridge).

13. The process according to claim 12, wherein the exchangeable container is provided with gas-tight quick-action couplings and can thus be easily exchanged.

14. The process according to claim 12, wherein the adsorber material is regenerated in the container.

15. The process according to claim 14, wherein the adsorber material is regenerated by contacting it with a nitrogenous gas stream at temperatures of 150 to 250° C.

16. The process according to claim 15, wherein the nitrogenous gas stream and/or the container is heated.

17. The process according to claim 14, wherein the adsorber material is regenerated once or many times until the uptake capacity with respect to the sulfur-comprising components bound by chemisorption is essentially spent.

* * * * *